(12) United States Patent
Kong

(10) Patent No.: US 10,547,257 B2
(45) Date of Patent: Jan. 28, 2020

(54) VARIABLE-SPEED CONTROLLER FOR USE WITH AN ELECTRIC DEVICE

(71) Applicants: Defond Components Limited, Chai Wan (HK); Dongguan Chen Da Appliance Co. Ltd, Guangdong (CN)

(72) Inventor: Ming Leong Kong, Chai Wan (HK)

(73) Assignees: Defond Electech Co., Ltd., Dongguan (CN); Defond Components Limited, Chai Wan (HK)

(*) Notice: Subject to any disclaimer, the term of this patent is extended or adjusted under 35 U.S.C. 154(b) by 0 days.

(21) Appl. No.: 15/803,235

(22) Filed: Nov. 3, 2017

(65) Prior Publication Data

US 2018/0323735 A1    Nov. 8, 2018

(30) Foreign Application Priority Data

May 5, 2017 (HK) .................................. 17104556

(51) Int. Cl.
| | |
|---|---|
| *H02P 7/06* | (2006.01) |
| *H01C 10/38* | (2006.01) |
| *H01C 10/30* | (2006.01) |
| *H02P 6/06* | (2006.01) |
| *H02P 7/29* | (2016.01) |
| *H02P 9/14* | (2006.01) |

(52) U.S. Cl.
CPC ............. *H02P 7/063* (2013.01); *H01C 10/30* (2013.01); *H01C 10/38* (2013.01); *H02P 6/06* (2013.01); *H02P 7/29* (2013.01); *H02P 9/14* (2013.01)

(58) Field of Classification Search
CPC ......... H01C 10/36; H01C 10/38; H02P 7/063; H01H 13/702; H01H 13/703; H01H 2221/014
USPC ...................................................... 338/160
See application file for complete search history.

(56) References Cited

U.S. PATENT DOCUMENTS 3,960,044 A * 6/1976 Nagai .................. G10H 1/0558
                                                                84/719
4,333,068 A * 6/1982 Kishel .................... H01C 10/08
                                                                338/114

(Continued)

FOREIGN PATENT DOCUMENTS

| CN | 201528307 | 7/2010 |
|---|---|---|
| CN | 2013151419 | 8/2013 |

(Continued)

*Primary Examiner* — Kyung S Lee
(74) *Attorney, Agent, or Firm* — Price Heneveld LLP

(57) ABSTRACT

A variable-speed controller for use with an electric device including: a variable resistor element having a variable resistor element contact surface; a membrane including a first membrane contact surface spaced-apart from the variable resistor element contact surface by a spacer element, and, a second membrane contact surface; a slider configured for slidable movement along the second membrane contact surface wherein responsive to the slider slidably moving along the second membrane contact surface, the first membrane contact surface is able to be urged into contact with the variable resistor element contact surface in a plurality of contact point configurations whereby the effective resistance of the variable resistor element is configured to change in response to the first membrane contact surface being urged into contact with the variable resistor element contact surface in each of the plurality of contact point configurations.

13 Claims, 5 Drawing Sheets

(56) References Cited

U.S. PATENT DOCUMENTS

| | | | | |
|---|---|---|---|---|
| 4,651,123 A | * | 3/1987 | Zepp | H01C 10/38 |
| | | | | 338/154 |
| 6,285,276 B1 | * | 9/2001 | Nedele | B66F 9/20 |
| | | | | 338/160 |
| 6,298,566 B1 | * | 10/2001 | Endo | G01B 7/004 |
| | | | | 33/1 PT |
| 7,629,871 B2 | * | 12/2009 | Schrum | H01C 10/06 |
| | | | | 338/185 |
| 9,514,866 B2 | * | 12/2016 | Huang | H01C 10/10 |
| 2007/0152612 A1 | | 7/2007 | Chen et al. | |

FOREIGN PATENT DOCUMENTS

| | | |
|---|---|---|
| CN | 106094909 | 11/2016 |
| CN | 205843593 | 12/2016 |
| CN | 206077271 | 4/2017 |
| DE | 19930435 | 12/2000 |
| GB | 2314980 | 1/1998 |

\* cited by examiner

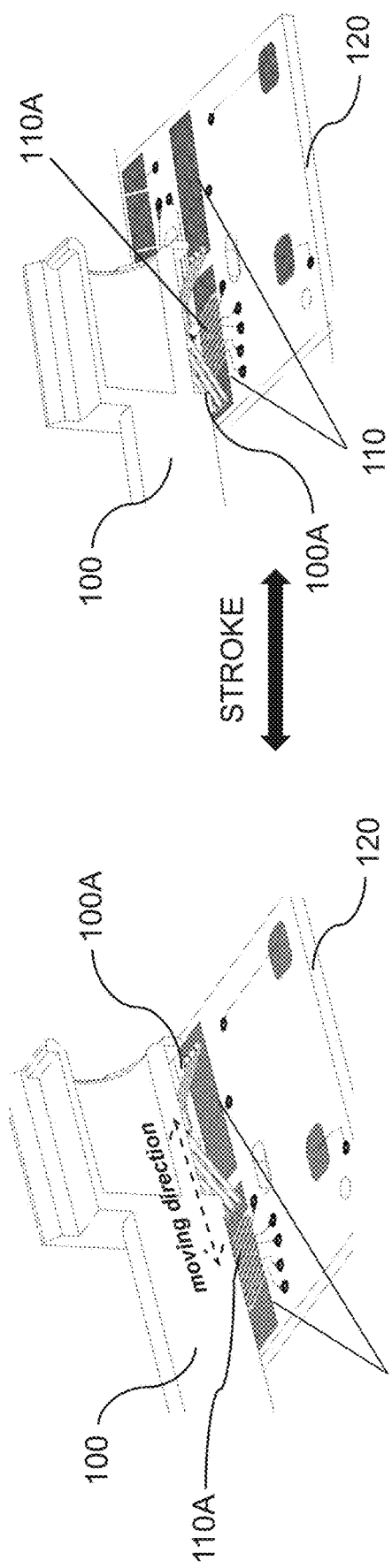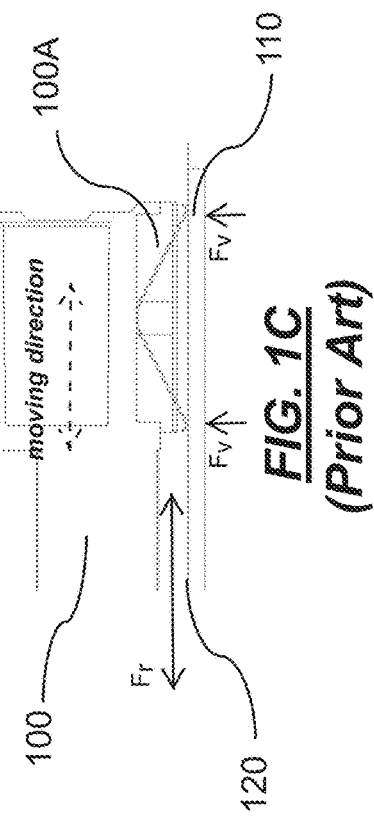
FIG. 1A (Prior Art)
FIG. 1B (Prior Art)
FIG. 1C (Prior Art)

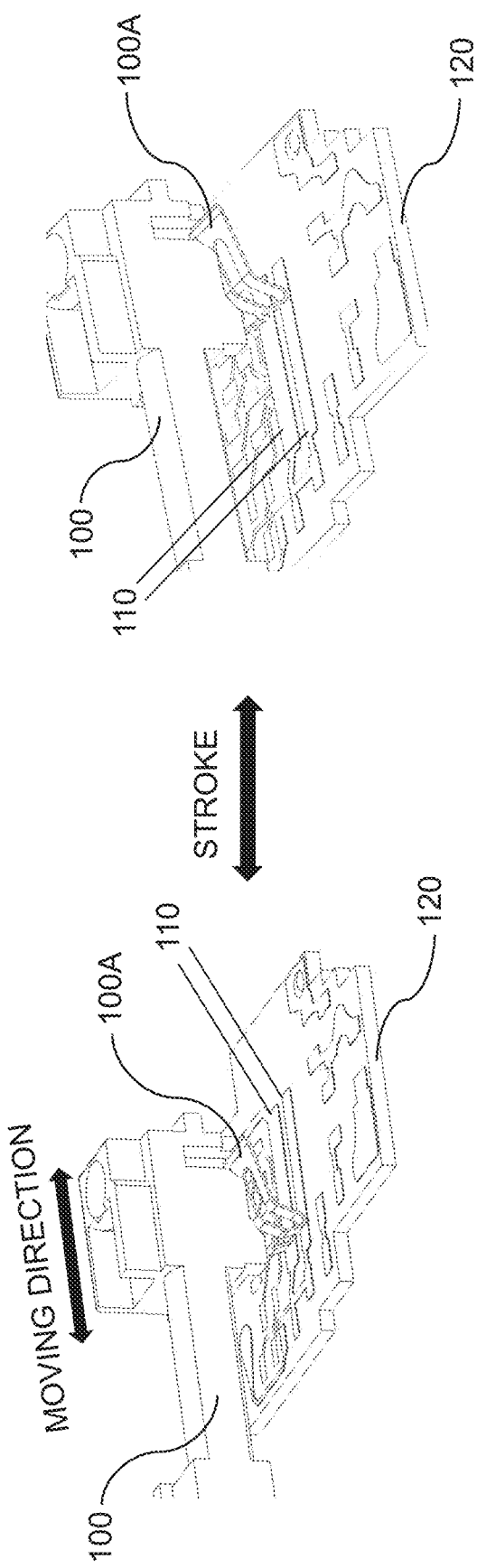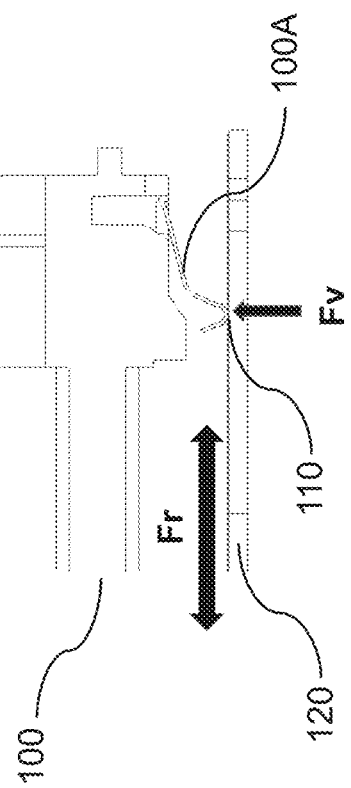
FIG. 2A (Prior Art)
FIG. 2B (Prior Art)
FIG. 2C (Prior Art)

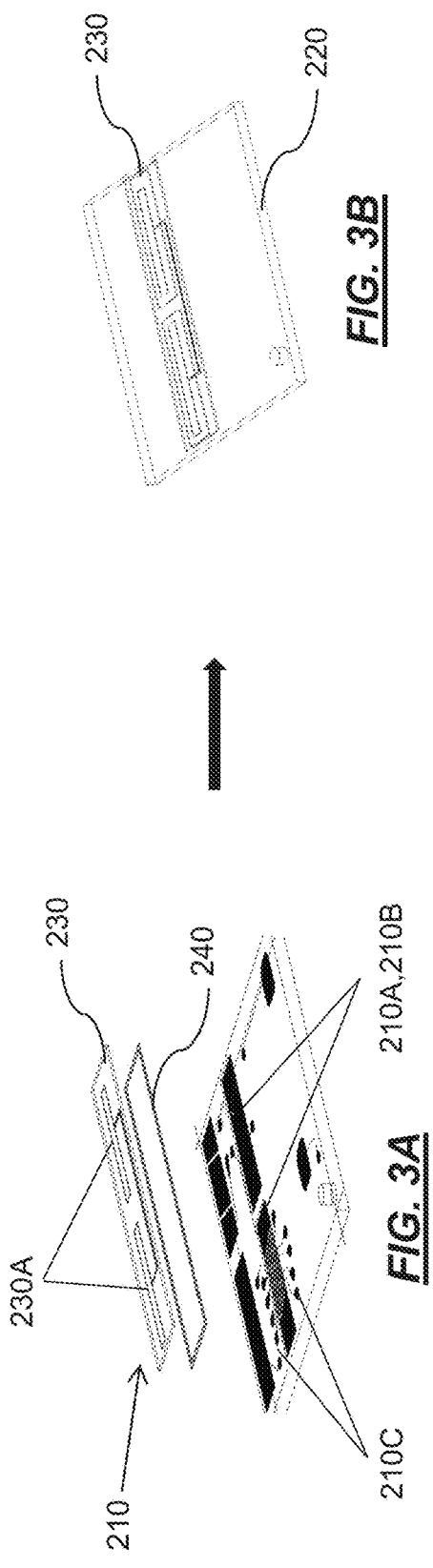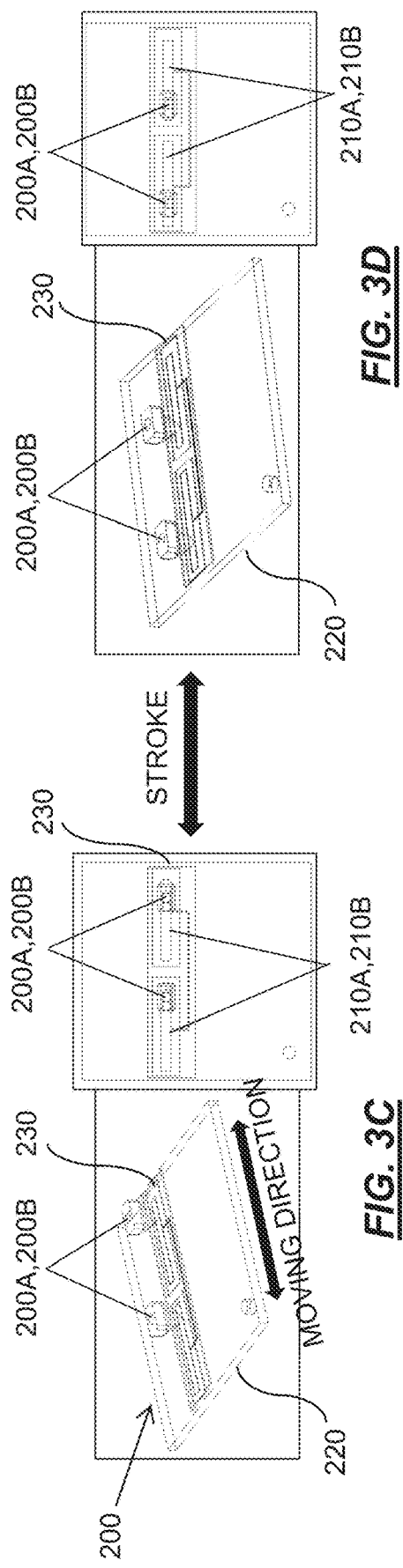

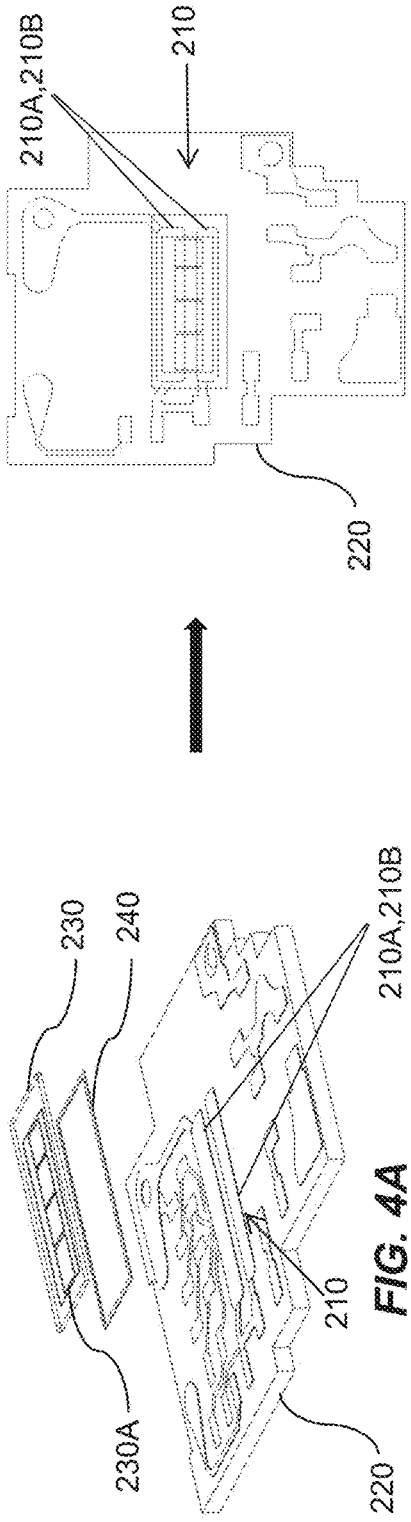
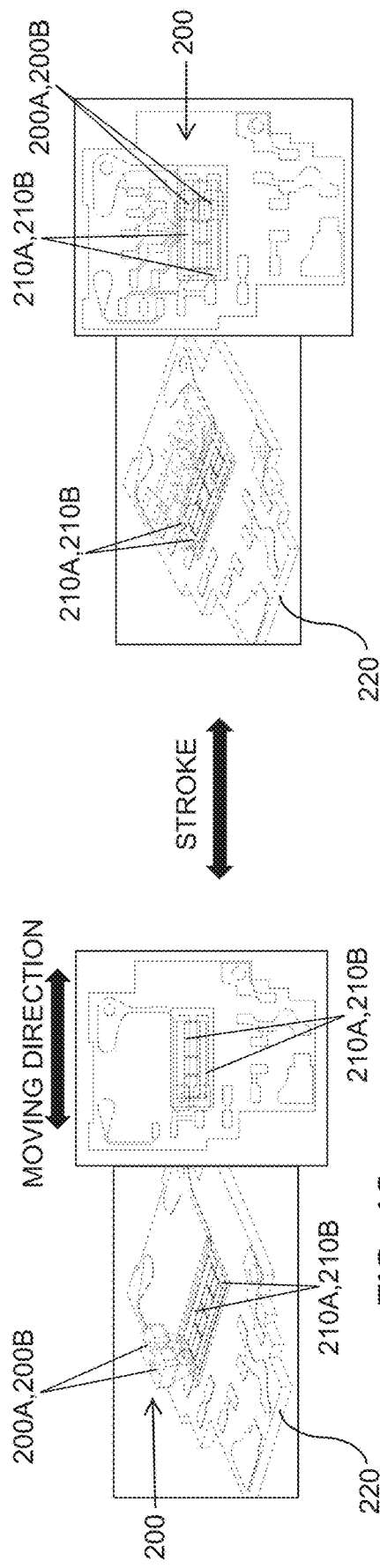
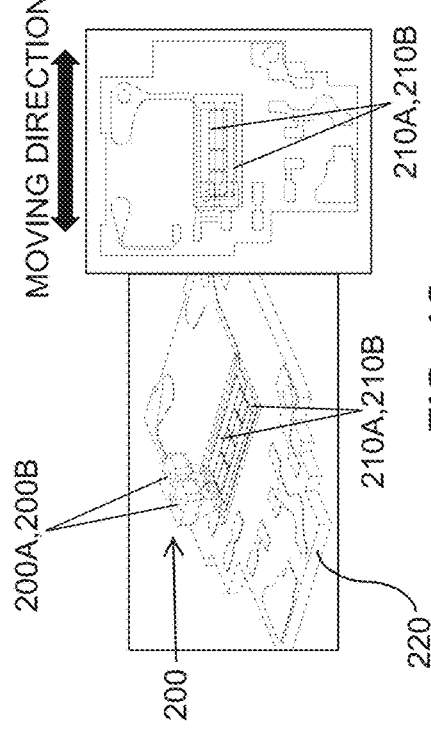

VARIABLE-SPEED CONTROLLER FOR USE WITH AN ELECTRIC DEVICE

CROSS-REFERENCE TO RELATED APPLICATION

This application claims priority to Hong Kong Short Term Patent Application No. 17104556.9, filed on May 5, 2017, entitled "A VARIABLE-SPEED CONTROLLER FOR USE WITH AN ELECTRIC DEVICE," the entire disclosure of which is hereby incorporated herein by reference.

FIELD OF THE INVENTION

The present invention relates to variable-speed controllers for use with electric devices such as electric power tools, gardening tools and the like.

BACKGROUND OF THE INVENTION

Conventional speed control in electric power tools is achieved by means of a potentiometer or the like having a variable resistor, such as a thin carbon film, that is disposed on a printed circuit board. The effective resistance of the thin carbon film may be varied, for instance, in response to movement of a trigger actuator, by sliding conductive wipers of the potentiometer upon a surface of the thin carbon film. A variable voltage measured across the variable resistor can then be utilized as an indicator of the movement of the actuator and the basis for controlling the speed of the motor. As the thin carbon film is subjected to repeated sliding movement with the conductive wipers, both the thin carbon film and the conductive wipers may undergo considerable wear and tear which may ultimately result in inaccurate or erratic speed control operation. Also, the thin carbon film tends to be exposed to contaminant particles which not only have a tendency to cause short-circuiting of tracks on the conductive pads, but, may also exacerbate the damage caused by scraping of the conductive wipers along the thin carbon film.

SUMMARY OF THE INVENTION

The present invention may involve several broad forms. Embodiments of the present invention may include one or any combination of the different broad forms herein described.

In a first broad form, the present invention provides a variable-speed controller for use with an electric device including: a variable resistor element having a variable resistor element contact surface; a membrane including a first membrane contact surface spaced-apart from the variable resistor element contact surface by a spacer element, and, a second membrane contact surface; a slider configured for slidable movement along the second membrane contact surface wherein responsive to the slider slidably moving along the second membrane contact surface, the first membrane contact surface is able to be urged into contact with the variable resistor element contact surface in a plurality of contact point configurations whereby the effective resistance of the variable resistor element is configured to change in response to the first membrane contact surface being urged into contact with the variable resistor element contact surface in each of the plurality of contact point configurations.

Preferably, the variable-speed controller may include a variable-speed trigger assembly.

Preferably, the variable-speed trigger assembly may include an actuator operably connected with the slider whereby the slider is slidably movable relative to the second membrane contact surface responsive to movement of the actuator.

Preferably, the variable resistor element may be disposed on a circuit board.

Preferably, the first membrane contact surface may be biased into the spaced-apart position relative to the variable resistor element contact surface.

Preferably, the first membrane contact surface and the variable resistor element contact surface may include conductive materials.

Preferably, at least one of the first membrane contact surface and the variable resistor element contact surface may include printed layers of conductive material.

Preferably, the spacer element may be integrally formed with a structure of the membrane.

Preferably, the membrane may include at least one of a polymeric, a co-polymeric, and a polymeric composite material.

Preferably, the variable resistor element contact surface may include a first region comprising a plurality of conductive tracks extending from junctions of a plurality of resistors in series, and, a second region comprising an electrically conductive surface configured for fixed electrical connection with an input pin of an integrated circuit chip of the variable-speed controller.

Typically, the first and second regions of the variable resistor element contact surface may be arranged in at least one of a series and a parallel configuration relative to each other.

Preferably, the slider may include a first and a second protruding portion configured for urging the first membrane contact surface into contact with the first and second regions respectively of the variable resistor element contact surface.

Typically, the first and second protruding portions may be configured for arrangement in at least one of a series and a parallel configuration.

Preferably, the electric device may include at least one of an electric power tool and an electric gardening tool.

These and other aspects, objects, and features of the present invention will be understood and appreciated by those skilled in the art upon studying the following specification, claims, and appended drawings.

BRIEF DESCRIPTION OF THE DRAWINGS

The present invention will become more fully understood from the following detailed description of a preferred but non-limiting embodiments thereof, described in connection with the accompanying drawings, wherein:

FIGS. 1A-1B show perspective views of a sequence of operation of a prior art variable-speed controller in which conductive wipers directly contact with and slides across first and second regions of a conductive pad of the variable resistor element, the first and second regions being arranged in series;

FIG. 1C shows a side-view of the prior art variable-speed controller shown in FIGS. 1A and 1B;

FIGS. 2A-2B show perspective views of a sequence of operation of a prior art variable-speed controller in which conductive wipers directly contact with and slide across first and second regions of a conductive pad of the variable resistor element, the first and second regions being arranged in parallel;

FIG. 2C shows a side-view of the prior art variable-speed controller shown in FIGS. 2A and 2B;

FIG. 3A shows an exploded-view of an aspect of a variable-speed controller comprising a membrane, a spacer element and first and second regions of a contact surface of a variable resistor element;

FIG. 3B shows an assembled view of the variable-speed controller of FIG. 3A;

FIGS. 3C-3D show perspective views of a sequence of operation of the variable-speed controller shown in FIGS. 3A-3B in which a slider slidably engages with a second membrane contact surface whereby first and second protruding portions of the slider urge a first membrane conductive surface into contact with first and second regions of a contact surface of a variable resistor element respectively, with the first and second contact regions being arranged in series;

FIG. 4A shows an exploded-view of an aspect of a variable-speed controller comprising a membrane, a spacer element and first and second regions of a contact surface of a variable resistor element;

FIG. 4B shows an assembled view of the variable-speed controller of FIG. 4A;

FIGS. 4C-4D show perspective views of a sequence of operation of the alternate embodiment variable-speed controller shown in FIGS. 4A-4B in which a slider slidably engages with a second membrane contact surface whereby first and second protruding portions of the slider urge a first membrane conductive surface into contact with first and second regions of a contact surface of a variable resistor element respectively, with the first and second contact regions being arranged in parallel.

DETAILED DESCRIPTION OF THE PREFERRED EMBODIMENTS

Figure 5A:
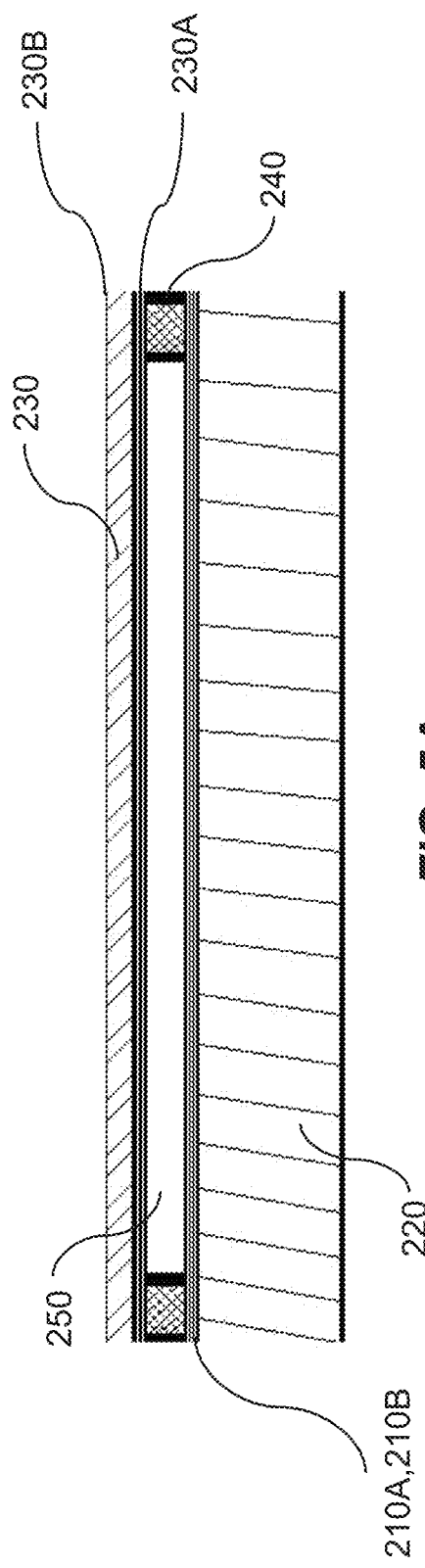
FIG. 5A shows a side-view of one aspect of the present invention in which a first membrane contact surface and a variable resistor element contact surface are arranged so as to face each other and are spaced-apart from each other by a spacer element when the slider is not sliding across the second membrane contact surface.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Preferred embodiments of the present invention will now be described herein with reference to FIGS. 3A to 5B. The embodiments comprise a variable-speed controller for use with an electric power tool having an electric motor including for instance an electric drill, grinder, sander, saw, rotary driving tool and the like. It would be appreciated and understood that whilst this embodiment is described for use with an electric power tool, this is merely for purposes of illustrating functionality and alternate embodiments of the present invention may of course be used with other types of electric devices such as gardening tools.

The electric power tool includes a brushless DC motor comprising a rotor and a stator for supplying a magnetic field that drives the rotor. The rotor of the brushless DC motor includes an output shaft supported by a number of bearings for providing output torque and is surrounded by a fixed magnet that generates a magnetic field. The stator is mounted around the rotor with an air-gap being disposed therebetween. Stator windings are located in the air-gap arranged relatively parallel with the rotor output shaft and may typically be connected in either of a Delta configuration or a three-phase WYE wiring configuration. When current flows through a stator winding, the resulting current in the stator winding generates a magnetic field that magnetically couples with the rotor and which "drags" the rotor around with it. The magnetic field generated by the fixed magnet in the rotor assembly will tend to align itself with the magnetic field generated by the stator such that the rotor will undergo rotational movement. Accordingly, by controlling the timing and sequential energization of the stator windings, this enables control of rotational movement of the rotor shaft to be set at any desired speed and direction of operation as will be described in greater detail below.

The electric power tool includes a trigger assembly having an actuator operably-connected with an electrical switch unit comprising a pair of electrical switching contacts. A molded plastic housing is mounted on the body of the electric power tool near to a handle of the electric power tool which encloses the electrical switching contacts and parts of the variable-speed trigger mechanism. The electrical switching contacts are arranged in series in an electrical circuit between the brushless DC motor and a DC power source (e.g. a battery pack) of the electric power tool. Squeezing of the trigger by the user's finger causes the actuator to move relatively inwardly of an opening in the housing along a movement axis (X-X') from an OFF position towards an ON position. When the user's finger releases the trigger, a return spring urges the actuator relatively outwardly of the opening in the housing along the movement axis (X-X') from the ON position toward the OFF position by the return spring. The actuator is operably connected to the electrical switching contacts such that in response to the actuator being moved into the ON position, the electrical switching contacts form a closed-circuit arrangement whereby power from the DC power source can be supplied to the brushless DC motor via the pair of electrical switching contacts. Conversely, in response to the actuator being urged back into the OFF position, the pair of electrical switching contacts are arranged into an opened-circuit configuration whereby the DC power source is not able to supply power to the brushless DC motor via the pair of electrical switching contacts. The actuator is movable through a range of positions along the movement axis (X-X') depending upon the amount of force applied to the trigger by the user's finger and the DC motor is configured to operate at variable speeds of operation depending upon the linear movement of the actuator along the movement axis (X-X') as will be described in detail as follows.

In a prior art variable-speed controller used with certain electric power tools, such as the example depicted in FIGS. 1A-1C, a slider 100 having a pair of wipers 100A and corresponding conductive pads 110 of a potentiometer disposed on a PCB 120 are in direct sliding contact with each other. FIG. 1A shows the wipers 100A arranged in a first position relative to the corresponding conductive pads 110 whilst FIG. 1B shows the wipers 100A arranged in a second relative position to the corresponding conductive pads 110A after being scraped across the conductive pads 110. It will be appreciated that the distance of sliding engagement as depicted, particularly when repeated many times over a period of time, will result in a relatively high amount of wear and tear in the respective parts. Furthermore, the conductive pads 110 are readily exposed to contaminant particles which may cause short-circuiting between the tracks on the conductive pads 110, as well as, exacerbating damage caused by scraping of the wipers 100A across the conductive pads 110. FIG. 1C shows the forces at work directly between the wipers 100A and the conductive pads 110 where Fr refers to the frictional forces acting between the wipers 100A and the conductive pads 110 as the wipers 100A scrape across the conductive pads 110, whilst Fv refers to the vertical force acting on the conductive pads 110 directly by the wipers 100A. FIGS. 1A-1C depict an example of a prior art variable-speed controller where the wipers 100A and corresponding conductive pads 110A are arranged in a series configuration. FIGS. 2A-2C depict another example of a prior art variable-speed controller in which the pair of wipers 100A and corresponding conductive pads 110 of the potentiometer are arranged in a parallel configuration. The same problems resulting as described above in respect to FIGS. 1A-1C are applicable also to this alternate example.

FIGS. 3A-3D, 4A-4D and 5A-5B show embodiments of a variable-speed controller in accordance with the present invention. Each of the embodiments include an integrated circuit chip, a variable resistor element, and a power module comprising the plurality of MOSFETs interfaced with input terminals of the stator windings of the DC brushless motor. The components are all mounted on a PCB 220 located in the molded plastic housing.

By way of example, the variable resistor element contact surface 210 having first and second regions 210A, 210B may comprise for instance, a bank of eight resistors that are configurable for connection in series between a power supply of the electric device and an input pin of the integrated circuit chip. A variable resistor element contact surface 210 is provided comprising the first region 210A upon which seven electrically conductive tracks 210C extend from the seven intermediate junctions between the eight resistors in series. The seven electrically conductive tracks 210C are printed on the surface of the PCB 220 to form an array of separate discrete tracks 210C on the first region 210A of the variable resistor element contact surface 210. The second region 210B of the variable resistor element contact surface 210 is also printed on the PCB 220 with the second region 210B being in fixed electrical connection with an input pin of the integrated circuit chip. Accordingly, it would be understood that a variable voltage may be selectively applied to the input pin of the integrated circuit chip by selectively electrically bridging the different tracks 210C in the first region 210A of the variable resistor element contact surface 210 with the second region 210B of the variable resistor element contact surface 210. In certain embodiments of the present invention, the first region 210A and the second region 210B of the variable resistor element contact surface 210 may be printed on the surface of the PCB 220 as elongate strips in a series configuration relative to each other, depicted in FIGS. 3A-3D, or, as elongate strips in a parallel configuration relative to each other, depicted in FIGS. 4A-4D.

Figure 5B:
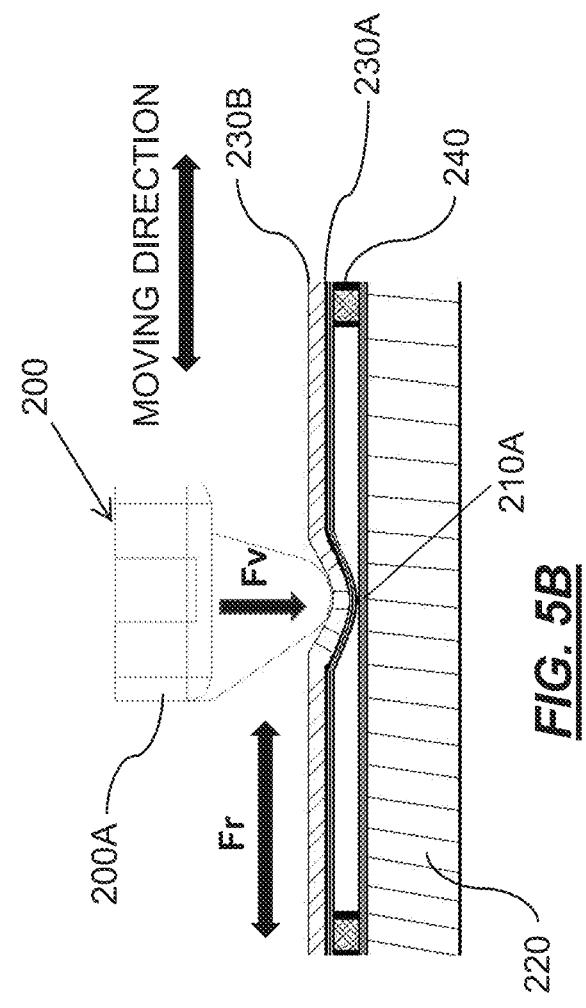
FIG. 5B shows a side-view of the aspect of the present invention shown in FIG. 5A in which the first membrane contact surface is urged into contact with the variable resistor element contact surface by a first protruding portion of a slider when the slider element is sliding across the second membrane contact surface.

Referring to FIGS. 5A and 5B, the variable-speed controller also includes a relatively thin and pliable membrane 230 which may, for instance, be formed from a polymeric, a co-polymeric, or a polymeric composite material. The membrane 230 includes a first membrane contact surface 230A disposed on a first side of the membrane 230 and a second membrane contact surface 230B disposed on an opposing side of the membrane 230. The first membrane contact surface 230A is formed by a conductive material printed on the first side of the membrane 230. The membrane 230 is adhesively mounted on the PCB 220 so that the first membrane contact surface 230A is facing the variable resistor element contact surface 210 and spaced apart from the variable resistor element contact surface 210 by a spacer element 240 whereby a space 250 is formed therebetween. The spacer element 240 is located around a periphery of the membrane 230 between the first membrane contact surface 230A and the variable resistor element contact surface 210. The spacer element 240 may also comprise a polymeric, a co-polymeric, or a polymeric composite material which is adhesively bonded at one end to the first membrane contact surface 230A and at another end to the variable resistor element contact surface 210. The first membrane contact surface 230A is biased into the spaced-apart position relative to the variable resistor element contact surface 210 by default. The biasing may be effected by configuring the structure of the membrane 230 itself, and/or by use of an external biasing element such as the spacer element 240. Therefore, when the trigger is not being squeezed by the user, the membrane 230 will be entirely spaced apart from the variable resistor element contact surface 210.

A slider 200 is operably connected with the trigger actuator and configured for slidable movement along the second membrane contact surface 230B in response to slidable movement of the actuator. The slider 200 includes a first and a second protruding portion 200A, 200B whereby as the slider 200 moves along the second membrane contact surface 230B, the first membrane contact surface 230A on the opposed side of the membrane 230 is urged into contact with the variable resistor element contact surface 210 at a plurality of contact point configurations due to the vertical force of the slider 200 pressing downward upon the second membrane contact surface 230B. In each of the plurality of contact point configurations, a first contact point is made where the first protruding portion 200A of the slider 200 has urged a portion of the first membrane contact surface 230A into contact with one of the tracks 210C disposed on the first region 210A of the variable resistor element contact surface 210, and, a second contact point is made where the second protruding portion 200B of the slider 200 has urged a portion of the first membrane contact surface 230A into contact with the second region 210B of the variable resistor element contact surface 210. Accordingly, as the slider 200 slides along the second membrane contact surface 230B the different tracks 210C on the first region 210A of the variable resistor element contact surface 210 are able to be selectively electrically bridged with the second region 210B of the variable resistor element contact surface 210 and the effective resistance of the variable resistor element may be controllably varied accordingly so as to result in varying voltage signal being applied to the input of the integrated circuit chip. This variable voltage input is indicative of the movement of the actuator and the integrated circuit chip is programmed to control operation of the motor by reference to the variable voltage signal.

The slider 200 may in certain embodiments be spring biased in a direction substantially perpendicular to the direction of movement of the slider 200. The configuration of the first and second protruding portions 200A, 200B of the slider 200 may be selected to match the configuration of the first and second regions 210A, 210B of the variable resistor element contact surface 210. For instance, if the first and second regions 210A, 210B of the variable resistor element contact surface 210 are arranged in a series configuration, then the first and second protruding portions 200A, 200B of the slider 200 will similarly be configured for arrangement in a series configuration on the slider 200 such as depicted in FIGS. 3A-3D. Alternately, if the first and second regions 210A, 210B of the variable resistor element contact surface 210 are arranged in parallel, then the first and second protruding portions 200A, 200B of the slider 200 will similarly be arranged in a parallel configuration on the slider 200, such as depicted in FIGS. 4A-4D.

The integrated circuit chip receives the variable voltage signal at the input point, and in response to the received variable voltage signal, outputs control signals which drives operation of the plurality of MOSFETs interfaced with the stator windings of the DC brushless motor. The integrated circuit chip is programmed to output control signals which drive the plurality of MOSFETs of the power module to energize their corresponding stator windings in accordance with a predetermined timing and sequence so that the brushless DC motor operates in a predetermined manner (i.e. speed, direction, torque) corresponding to the actuator movement indicated by the variable voltage signal. The speed and torque of the DC brushless motor is dependent upon the amount of power that can be supplied to the stator windings via their corresponding input MOSFETs. In this embodiment, the amount of power supplied to the stator windings can be controllably varied by use of pulse width modulation techniques whereby the output of a timing signal generator (e.g. a "555" circuit) is used as an input to gates of the MOSFETs to suitably effect high speed switching of the MOSFETs whereby the resulting power switched through the MOSFETs to the stator windings provides the desired amount of speed and torque produced by the DC brushless motor. The timing signal generator signal may therefore serve as the control signal for controlling operation of the MOSFETs.

Advantageously, the presence of the membrane 230 between the variable resistor element contact surface 210 and the slider 200 may assist in alleviating wear and tear of both the variable resistor element contact surface 210 and the slider 200 as they are not in direct physical contact. Accordingly, the reliability and stability of operation of the variable-speed controller may be maintained over a greater duration of use compared to with conventional type variable-speed controllers. Furthermore, the presence of the membrane may also assist in preventing contaminants from inadvertently short-circuiting tracks 210C of the variable resistor element contact surface 210 and may thereby assist in alleviating erratic or inaccurate operation of the variable-speed controller.

In alternate embodiments of the present invention, it may be possible to utilize arrangements where for instance the PCB 220 may instead be fabricated on a flexible membrane material and the protruding portions of the slider 200 may be configured for urging the PCB 220 into contact with the variable resistor element in a converse manner to that as described in relation to the embodiments above.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A variable-speed controller for use with an electric power tool including:
    a variable resistor element having a variable resistor element contact surface;
    a membrane including a first membrane contact surface spaced-apart from the variable resistor element contact surface by a spacer element, and, a second membrane contact surface;
    a slider configured for slidable movement along the second membrane contact surface wherein responsive to the slider slidably moving along the second membrane contact surface, the first membrane contact surface is able to be urged into contact with the variable resistor element contact surface in a plurality of contact point configurations whereby effective resistance of the variable resistor element is configured to change in response to the first membrane contact surface being urged into contact with the variable resistor element contact surface in each of the plurality of contact point configurations;
    an actuator assembly including an actuator operably-connected with the slider whereby the slider is slidably moved relative to the second membrane contact surface responsive to movement of the actuator, and said actuator includes a hand-operable portion via which force is able to be applied to the actuator by a user's hand to move the actuator inwardly of a housing; and
    wherein said electric power tool includes at least one of a hand-operable electric drill, electric grinder, electric sander, electric saw, electric rotary driving tool, power tool, and electric gardening tool.

2. The variable-speed controller of claim 1, further comprising:
    a variable-speed trigger assembly.

3. The variable-speed controller of claim 2, wherein the variable-speed trigger assembly includes the actuator assembly operably connected with the slider whereby the slider is slidably moved relative to the second membrane contact surface responsive to movement of the actuator.

4. The variable-speed controller of claim 1, wherein the variable resistor element is disposed on a circuit board.

5. The variable-speed controller of claim 1, wherein the first membrane contact surface is biased into a spaced-apart position relative to the variable resistor element contact surface.

6. The variable-speed controller of claim 1, wherein the first membrane contact surface and the variable resistor element contact surface include conductive materials.

7. The variable-speed controller of claim 1, wherein at least one of the first membrane contact surface and the variable resistor element contact surface include printed layers of conductive material.

8. The variable-speed controller of claim 1, wherein the spacer element is integrally formed with a structure of the membrane.

9. The variable-speed controller of claim 1, wherein the membrane includes at least one of a polymeric, a co-polymeric, and a polymeric composite material.

10. The variable-speed controller of claim 1, wherein the variable resistor element contact surface includes a first region comprising a plurality of conductive tracks extending from junctions of a plurality of resistors in series, and, a second region comprising an electrically conductive surface configured for fixed electrical connection with an input pin of an integrated circuit chip of the variable-speed controller.

11. The variable-speed controller of claim 10, wherein the first and second regions of the variable resistor element contact surface are arranged in at least one of a series and a parallel configuration relative to each other.

12. The variable-speed controller of claim 10, wherein the slider includes first and second protruding portions configured for urging the first membrane contact surface into contact with the first and second regions, respectively, of the variable resistor element contact surface.

13. The variable-speed controller of claim 12, wherein the first and second protruding portions are configured for arrangement in at least one of a series and a parallel configuration.

* * * * *